United States Patent
Chapman et al.

(10) Patent No.: US 8,543,717 B2
(45) Date of Patent: Sep. 24, 2013

(54) RETAINING CHANNEL SYNCHRONIZATION THROUGH USE OF ALTERNATE CONTROL CHARACTERS

(75) Inventors: William L. Chapman, Hemlock, NY (US); Shawn E. O'Hara, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1882 days.

(21) Appl. No.: 11/013,069

(22) Filed: Dec. 15, 2004

(65) Prior Publication Data

US 2005/0141943 A1 Jun. 30, 2005

Related U.S. Application Data

(60) Provisional application No. 60/532,290, filed on Dec. 23, 2003.

(51) Int. Cl.
*G06F 15/16* (2006.01)

(52) U.S. Cl.
USPC ......................................... 709/230

(58) Field of Classification Search
USPC ......................................... 709/230
See application file for complete search history.

(56) References Cited

U.S. PATENT DOCUMENTS

| | | | |
|---|---|---|---|
| 4,486,739 A | 12/1984 | Franaszek et al. | |
| 4,823,076 A * | 4/1989 | Haines et al. | 324/121 R |
| 4,868,677 A * | 9/1989 | Tompane | 358/302 |
| 5,107,489 A | 4/1992 | Brown et al. | |
| 5,185,862 A * | 2/1993 | Casper et al. | 709/236 |
| 5,321,361 A * | 6/1994 | Goodman | 324/326 |
| 5,396,240 A * | 3/1995 | Schowe | 341/97 |
| 5,905,756 A | 5/1999 | Lamkin et al. | |
| 6,061,078 A * | 5/2000 | Ng et al. | 347/237 |
| 6,321,361 B1 * | 11/2001 | Autechaud et al. | 714/807 |
| 6,477,277 B1 * | 11/2002 | Chippendale et al. | 382/232 |
| 7,082,479 B2 | 7/2006 | Chapman et al. | |
| 2003/0086506 A1 | 5/2003 | Crochon et al. | |
| 2004/0024907 A1 * | 2/2004 | Chapman et al. | 709/248 |
| 2006/0209713 A1 | 9/2006 | Chapman et al. | |

FOREIGN PATENT DOCUMENTS

| | | | |
|---|---|---|---|
| WO | WO99/01981 | * | 1/1999 |
| WO | WO9901981 | * | 1/1999 |

* cited by examiner

*Primary Examiner* — William Goodchild
(74) *Attorney, Agent, or Firm* — Christopher J. White

(57) ABSTRACT

A method and system to improve the retention of synchronization between the transmitter and receiver of image data across a communication channel. If the control character designating the end of the line of data is corrupted, the receiving system will not recognize that the line of data has ended and will continue as if data is still being received. The corruption of a single bit in the control character will cause the receiver to misinterpret the end of line control word. Since the receiving logic does not realize the transmitter is no longer sending data, erroneous data will be stored in the storage elements. By using an alternate control character as an additional end of line indicator, the receiver will terminate the line of data and will wait for the next start of line control character from the transmitter. Synchronization between the transmitter and receiver across the communication channel is thus maintained.

2 Claims, 6 Drawing Sheets

RETAINING CHANNEL SYNCHRONIZATION THROUGH USE OF ALTERNATE CONTROL CHARACTERS

CROSS REFERENCE TO RELATED APPLICATION

Reference is made to and priority claimed from U.S. Provisional Application Ser. No. 60/532,290, filed Dec. 23, 2003, entitled RETAINING CHANNEL SYNCHRONIZATION THROUGH USE OF ALTERNATE CONTROL CHARACTERS.

FIELD OF THE INVENTION

The invention relates generally to non-impact printing and, more importantly, to methods and a system to retain synchronization for image data sent across a communication channel.

BACKGROUND OF THE INVENTION

Light-emitting diode (LED) arrays are used in non-impact printers for recording or printing an image on a photosensitive medium such as film or paper. The LEDs are arranged in a linear array and a relative movement is made between the linear array and the photosensitive medium to produce a scanning movement of the linear array over the surface of the photosensitive medium. The photosensitive medium is exposed to provide a desired image a line at a time as it is advanced relative to the LED array. Each LED in the array exposes a pixel in the photosensitive medium with electronic signal information from a source that defines an image. Image processing electronics converts the information into electrical current.

In a printing system, such as that described in U.S. Pat. No. 6,061,078, control characters are sent across a communication channel to designate the starting point of a line of image data, the ending point of the line of data, and the time to start an exposure sequence. In the system described in U.S. Pat. No. 6,061,078, the same control character is used to designate the end of the line of data as to designate the start of the line of data. A separate control character is used to designate the start of the exposure sequence.

These control characters are sent with each line of image data. The line of image data that is exposed onto the photoconductor is the line of data that was sent previously. Basically, the imaging element has a one line buffer that holds the 'just sent' line of data and then exposes the line of data that was sent on the prior transmission interval.

The photoconductor is a drum or web that is moving at a nominal rate. Signals are sent from electronics associated with the photoconductor that indicate when the current line of data should be imaged onto the photoconductor. The transmitter accesses these signals and determines when to send the next line of data to the receiver. In each case, the transmitter sends a start of line character (SOL), the image data, an end of line character (EOL), and then the exposure start character (EXP). For the system described in U.S. Pat. No. 6,061,078, the SOL character and the EOL character have the same bit pattern.

In a printing system, as described in U.S. Pat. No. 6,061,078, there are many noise sources. The equipment, in general, requires high voltage power supplies and charging elements. There are many opportunities for arcing to occur, which generates a broadband of spurious noise. In this environment, the opportunity exists for these external noise sources to interfere or corrupt the communication channel. Since the transmission of data across the link is tied to the movement of the photoconductor, the data must be present at the imaging element when the exposure sequence starts. If erroneous data is stored at the imaging element when the exposure sequence starts, a corrupted image will be produced. Specifically, the integrity and timing of the control characters must be maintained since a loss of a single control character interrupts the synchronization between the transmitter and receiver. The resulting image produced at the photoconductor will be corrupted until the transmitter and receiver can regain synchronization.

SUMMARY OF THE INVENTION

The present invention provides a means to improve the retention of synchronization between the transmitter and receiver of image data across a communication channel. In particular, it provides an improvement on a line-by-line basis by utilizing alternate control characters to indicate to the receiver to terminate the line. If either control character is received, the receiver recognizes that the end of the line has occurred and will prepare for receiving the next line of data.

In a first exemplary embodiment, if the control character designating the end of the line of data is corrupted, the receiving system will not recognize that the line of data has ended and will continue as if data still is being received. The corruption of a single bit in the control character by noise in the environment will cause the receiver to misinterpret the end of line control word. Since the receiving logic does not realize the transmitter is no longer sending data, erroneous data will be stored in the storage elements. The control character designating the start of the exposure sequence may still be received. By using the exposure start control character as an alternate end of line indicator, the receiver will terminate the line of data and will wait for the next start of line control character from the transmitter. Synchronization between the transmitter and receiver across the communication channel is thus maintained.

In a second exemplary embodiment, each control character is transmitted twice in succession before any data or the next control character is transmitted. The start of line control character is sent twice before the actual transmission of data characters commences. The end of line control character is sent twice and is followed by duplicate transmission of the exposure control character.

In a third exemplary embodiment, at least one alternate control character is transmitted after each control character. This is a generalization of the second embodiment, since each control word is followed by another control word, which can be a special control character or the same as the immediately preceding control character. An alternate character is sent after each of the start of line control character, end of line control character and exposure control character.

DESCRIPTION OF THE DRAWINGS

The invention is better understood by reading the following detailed description of the invention in conjunction with the accompanying drawings.

DETAILED DESCRIPTION OF THE INVENTION

Figure 1:
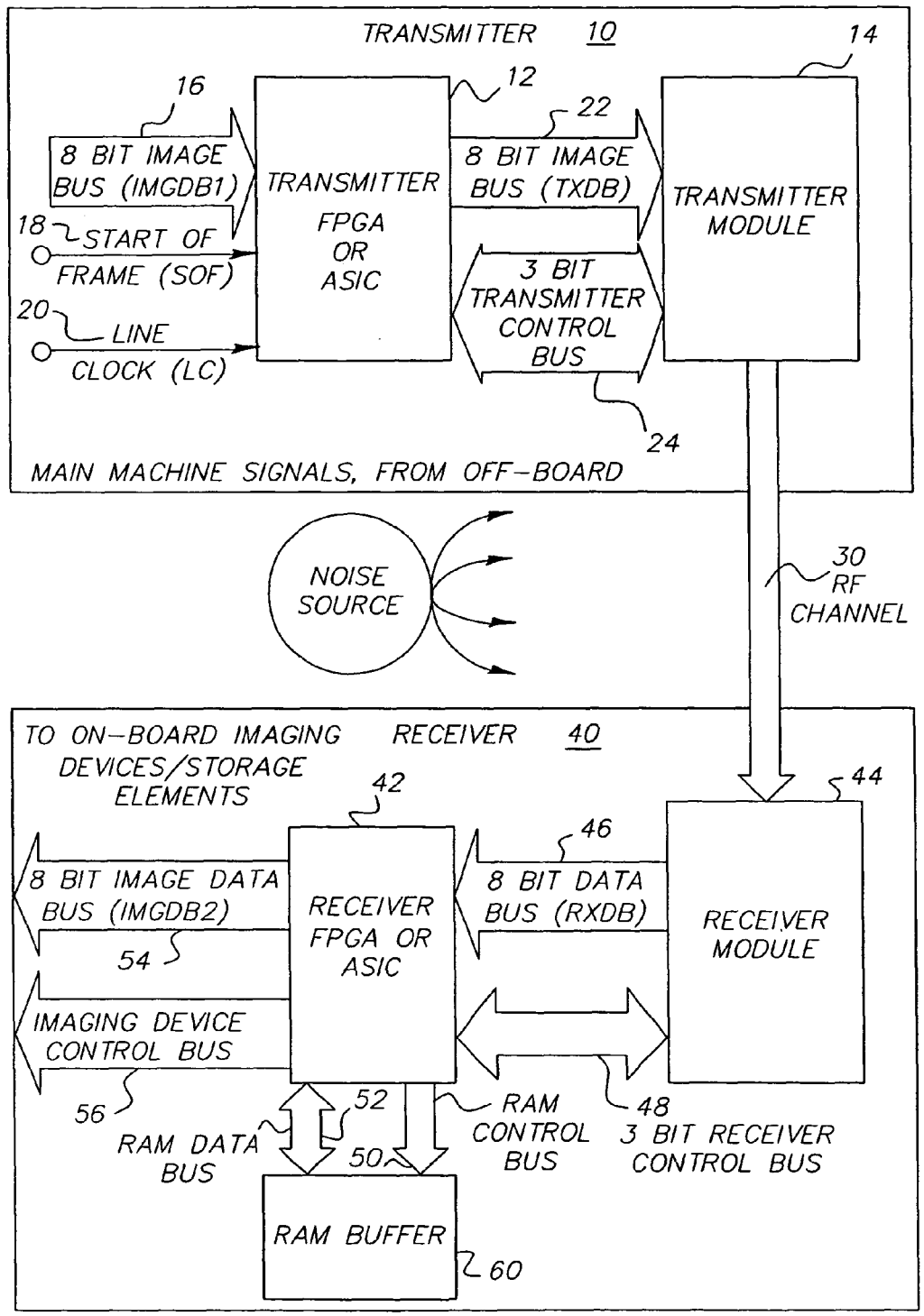
FIG. 1 illustrates a block diagram implementation of the transmitter and receiver components used in an exemplary embodiment of the invention.

The following description of the present invention is provided as an enabling teaching of the invention in its best, currently known embodiment. Those skilled in the relevant art will recognize that changes can be made to the embodiments described, while still obtaining the beneficial results of the present invention. Accordingly, those who work in the art will recognize that modifications and adaptations to the present invention are possible and may even be desirable in certain circumstances, and are a part of the present invention. Thus, the following description is provided as illustrative of the principles of the present invention and not in limitation thereof since the scope of the present invention is defined by the claims.

The following terms and abbreviations are used in the description of the invention.

Start of Line (SOL)—a control word sent in a specific data transmission system that tells the receiver when a line of image data is starting.

End of Line (EOL)—a control word sent in a specific data transmission system that tells the receiver when a line of image data is ending.

Exposure Start (EXP)—a control word sent in a specific data transmission system that tells the receiver when to start exposing a line of image data onto a photoconductor.

Start of Frame (SOF)—a control signal sent from the drum electronics in a specific printing system that tells a transmitter in a specific communication system that an image transfer process has started.

Line Clock (LC)—a control signal sent from the drum electronics in a specific printing system that tells a transmitter in a specific communication system when a new line of data is to be transferred to an imaging element.

Application Specific Integrated Circuit (ASIC)—A non-volatile integrated circuit configured to perform specific functions.

Field Programmable Gate Array (FPGA)—A programmable integrated circuit whose functions depend on its programming. This device can be fused or static-ram based. It may be volatile such as static-ram based devices or, when programmed, non-volatile such as fusible link devices.

As described in U.S. Pat. No. 6,061,078, LED printheads include a single row of LEDs formed in chip arrays. The number of LEDs on each chip array will vary based on the desired resolution of the printer. The chip arrays are mounted end to end on a support on the printhead, so that a single row of several thousand LEDs is provided. Driver IC chips may be mounted on one or both sides of this row of LEDs with the driver IC chips incorporating the circuitry for handling the data signals to determine which LEDs are to be turned on or illuminated during a pixel recording period and for providing the driving currents to the LEDs turned on. Parallel signal carrying lines are provided to carry signals from a logic control unit and power supply to control operation of the print head.

As further described in U.S. Pat. No. 6,061,078, which is fully incorporated by reference herein, a data source such as a computer, word processor, image scanner or other source of digitized image data provides image data signals to a data processor or image processing electronics. The data processor, under control of clock pulses from a marking engine controller provides a plurality of outputs, including rasterized data outputs and control signals, which are fed to the printhead. The marking engine controller provides exposure clock pulses to a down/up counter that counts such clock pulses and provides at an output having a plurality of lines, a digital representation of the state of the counter. The output of the counter is provided to a first set of input terminals to a comparator associated with each recording element (i.e., LED). A plurality of data lines from a corresponding multi-bit data latch register is connected as an input to a second set of input terminals associated with each comparator. The comparators compare the output of the counter with the value of the respective data output from the respective data latch register on the data lines. The image data signals provided to each comparator relates to a desired on-time or period of enablement for a respective LED for the recording of a particular pixel corresponding to the image data signals. The image data signals provided to each comparator during the printing of a single line of dots by the row of LEDs is related to the desired pixel or dot density to be exposed onto the image receiver medium by that LED for that particular line of dots.

The recording medium is preferably an electrophotoconductive recording medium used in an electrophotographic recording apparatus in which a uniform electrostatic charge is deposited on the recording medium and the exposure from the LEDs imagewise modulates the charge to form an electrostatic image, which is then developed with electroscopic-pigmented toner particles and transferred to a receiver sheet.

The various embodiments described in U.S. Pat. No. 6,061,078 generally feature an exposure clock counter, a comparator that compares image data for a pixel to be recorded with an exposure count, logic for synchronizing turning on of current to the LED based on the status of the comparator, and logic for turning off of current to the LED based either on the comparator status or the comparator status plus an additional exposure clock pulse. Other logic arrangements can also be used.

FIG. 1 illustrates a block diagram implementation of the transmitter and receiver components of the present invention. The receiver code is implemented in a field programmable gate array (FPGA) or application specific integrated circuit (ASIC). The transmitter 12 resides on a different board 10 than the receiver 42. The "machine electronics" (or photoconductor electronics) reside on still a different board. The receiver board 40 resides on the "imaging head" subsystem. A photoconductor (not shown) moves relative to the imaging head. An encoder is attached to, and rotates with movements of the photoconductor. It sends electrical signals that indicate the speed of the photoconductor. The machine electronics or photoconductor electronics receives these signals and generates the start of frame (SOF) signals 18 and line clock (LC) signals 20. The signals are output from the machine electronics and sent to the transmitter board 10. The photoconductor electronics also sends other signals to the "front end" image path electronics so that image data is flowing to the transmitter on image bus 16 when the SOF signals 18 and LC signals 20 arrive. The transmitter board 10 packets an image within the SOF and a line of image between each LC on data bus 22. One sheet of image will comprise one SOF signal 18 and many LC signals 20.

Transmitter module 14 transmits the image packet over RF channel 30 to receiver module 44 on receiver board 40. The received data is provided on data bus 46 to the receiver 42 and stored in RAM buffer 60 via RAM data bus 52. The image data is provided on image data bus 54 to the on-board imaging device and storage elements where the image data is exposed and produced at the imaging element. Also depicted in FIG. 1 are transmitter control bus 24 on transmitter board 10 and receiver control bus 48 and image device control bus 56 on receiver board 40.

Figure 2:
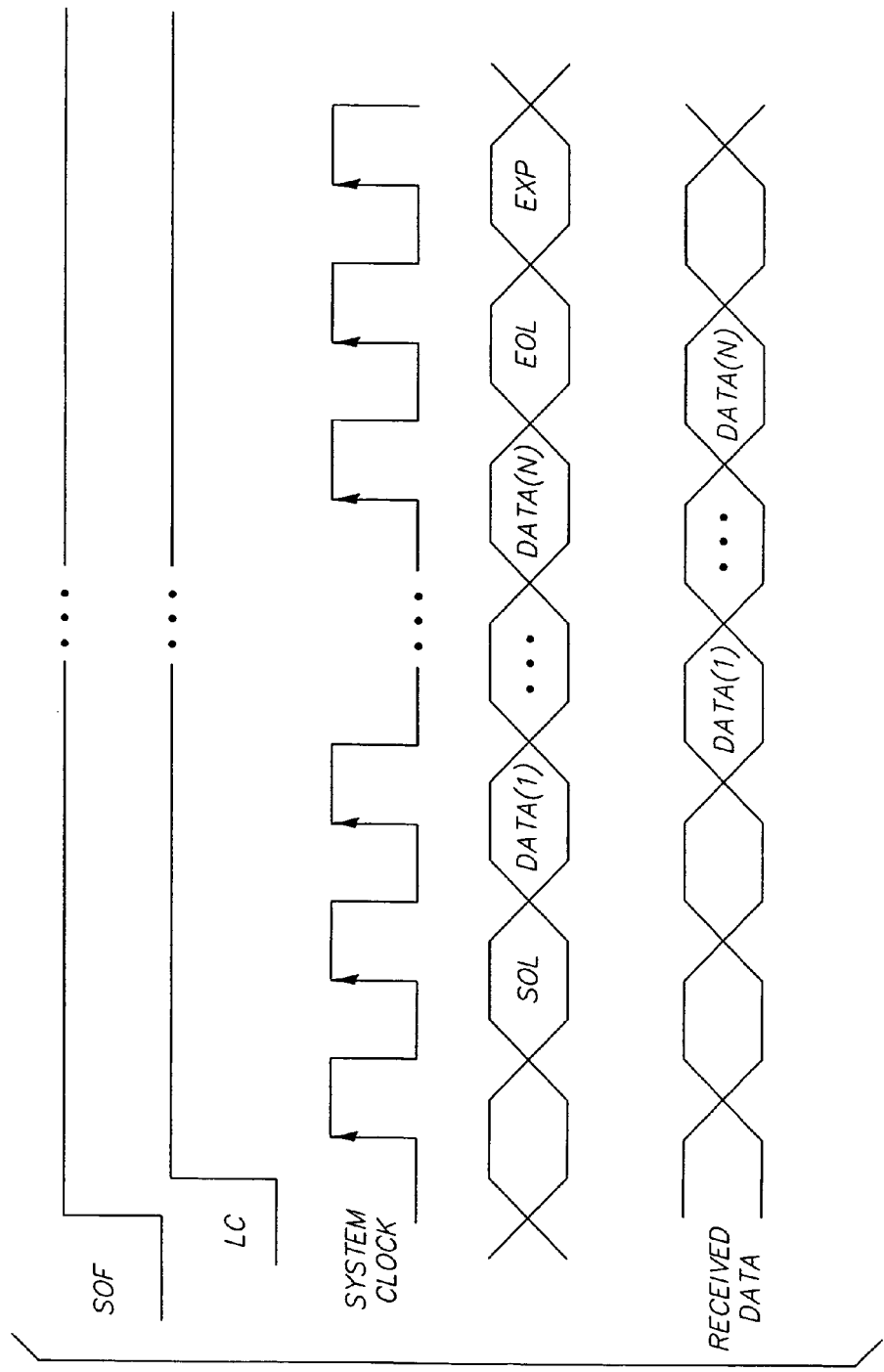
FIG. 2 illustrates a timing diagram for the transmission and reception of a line of image data across a communication channel.

Communication from the transmitter to the receiver is as shown in FIG. 2. The transmitter receives a start of frame (SOF) indication from the photoconductor. This indicates to the transmitter that an image is to be exposed onto the photoconductor drum. The transmitter prepares for the indicator, the LC signal, from the photoconductor electronics that indicates the first line of data is to be transferred across the communication link. The photoconductor electronics forces the LC signal to a logic high, when the first line of data is to be transferred. A short time after asserting the LC line to logic high, it returns the line to logic low. When the photoconductor electronics determines the next line of data is to be sent, it again forces the LC line to logic high. This continues until the image has been transferred. When the transmitter detects the LC line going to logic high, it sends a line of data, with control characters, across the communication link. The line of data is sent as follows: the transmitter sends a SOL character followed by the image data a specified number of clocks later. A specific number of clocks after the last data byte is sent, the transmitter sends the EOL character. A specific number of clocks after the EOL character is sent, the transmitter sends the EXP character. The transmitter then waits for the next LC transition to send the next line of data.

Figure 3:
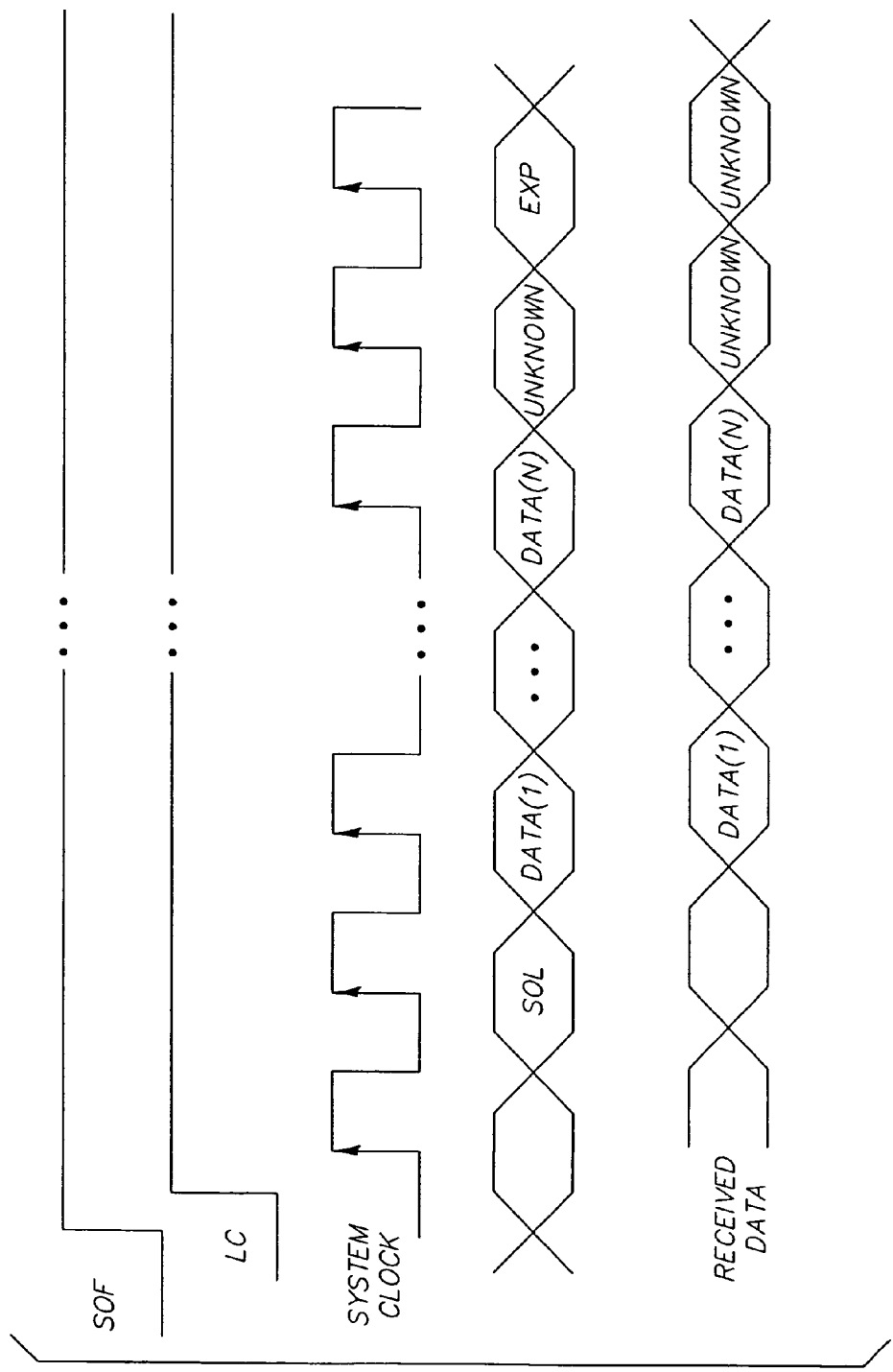
FIG. 3 illustrates a timing diagram for the transmission and reception of a line of image data in which the end of line character is corrupted.

If the EOL character is corrupted as shown in FIG. 3, the receiver will not know that a line of data has ended and will not be ready for the next line of data sent by the transmitter. It will continue to decode any further data transmissions from the transmitter as belonging to this same line of data and will not update the image storage elements properly. It will continue to receive the EXP control characters and will expose the line of data that is in the storage elements. This will result in corrupted images at the photoconductor. If the receiver uses either the EOL or the EXP to terminate the received line of data, it is ready for the next SOL from the transmitter and will receive and transfer the data to the image storage elements appropriately. The use of the EXP with a corrupted EOL is shown in FIG. 4.

Figure 4:
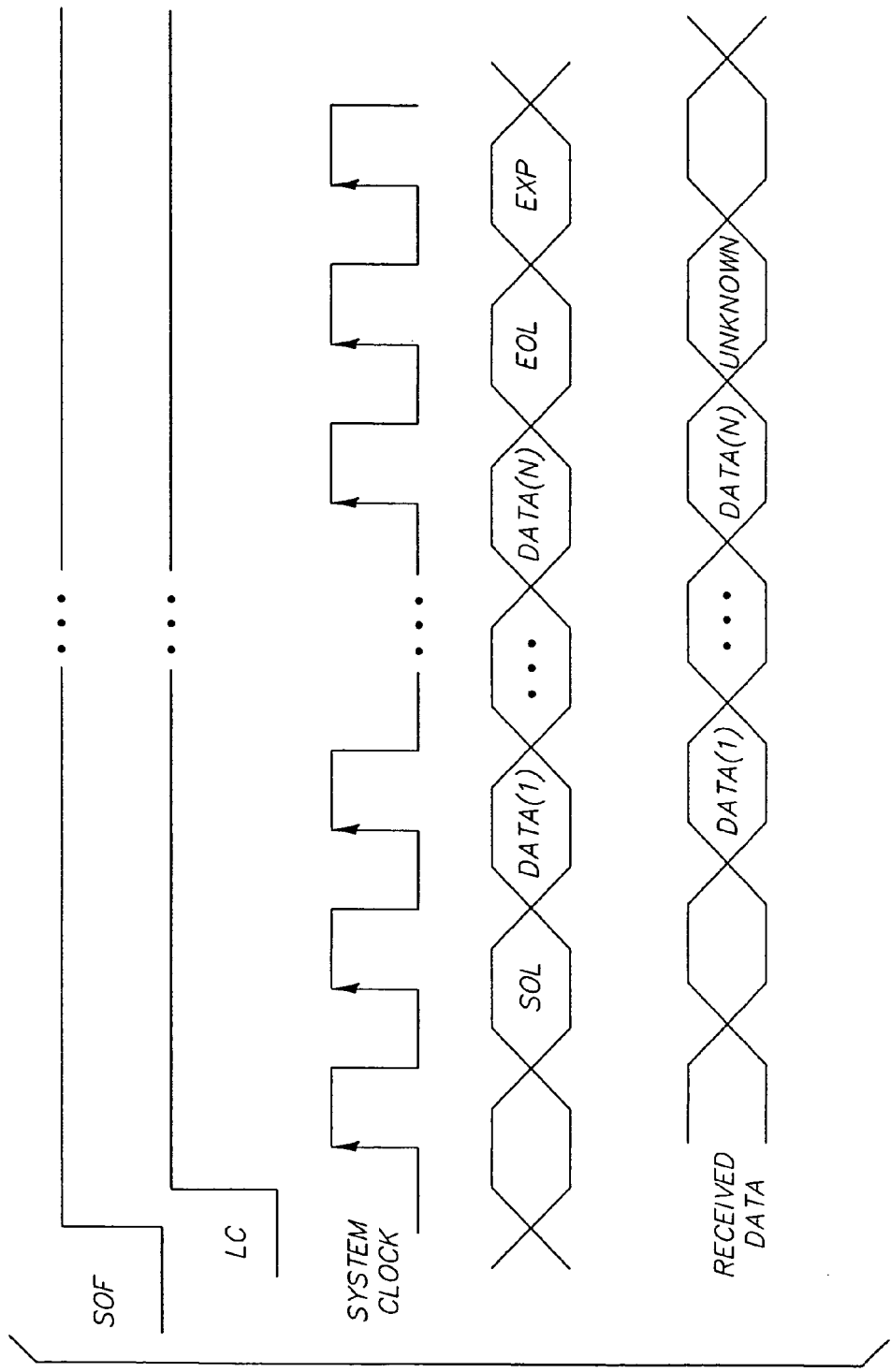
FIG. 4 illustrates a timing diagram for the transmission and reception of a line of image data in which the exposure start control word is used as an alternate end of line control word.

As shown in FIG. 4, the EOL character has been corrupted. The receiver does not recognize this as a valid EOL character. When the receiver decodes the EXP character, it recognizes that the line of data has ended even though the EOL character was not received. The receiver will now prepare for the next line of data from the transmitter.

Figure 5:
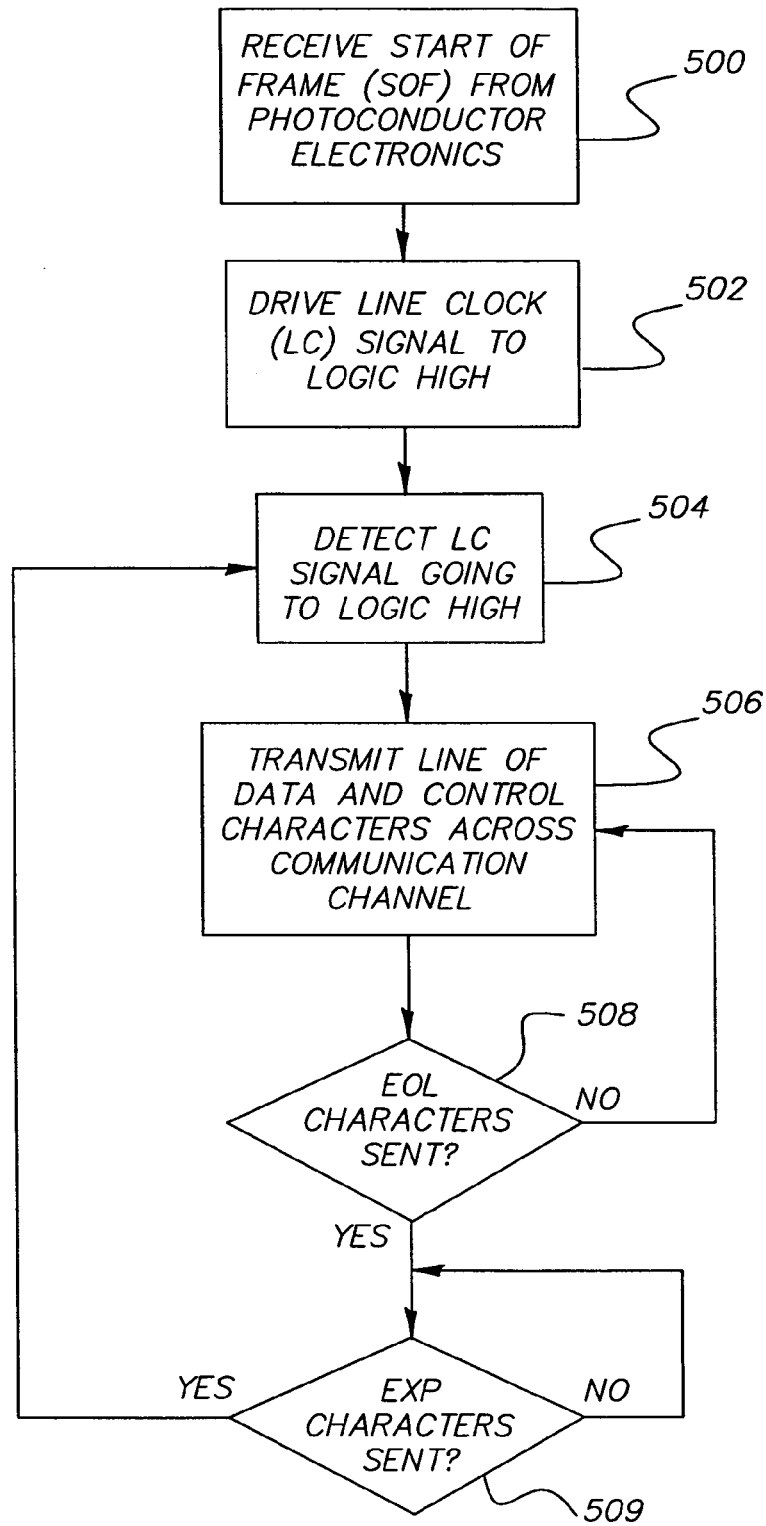
FIG. 5 illustrates processing logic for preparing and transmitting image data across a communication channel.

FIG. 5 illustrates processing logic for preparing and transmitting image data across a communication channel. Processing starts as indicated in logic block 500 with the transmitter receiving a start of frame control signal indicating that an image transfer process has started. A line clock control signal is then sent from the photoconductor electronics indicating to the transmitter that a new line of data is to be transferred to the imaging element. This is accomplished by asserting the line clock logic line to high as indicated in logic block 502. The transmitter detects the LC signal going high as indicated in logic block 504. The transmitter then sends a start of line (SOL) character, a line of image data and an end of line (EOL) character as indicated in logic 506. A test is then made in decision block 508 to determine if the EOL character has been sent. If it has, then in decision block 509 a test is made to determine if the exposure start (EXP) character has been sent. If the EOL character has not been sent as determined in decision block 508, control returns to logic block 506 as the line of image data continues to be sent. If the exposure start character has been sent as determined in decision block 509, then control returns to logic block 504 where the transmitter waits for the next LC transition to a logic high state before the next line of image data is sent.

Figure 6:
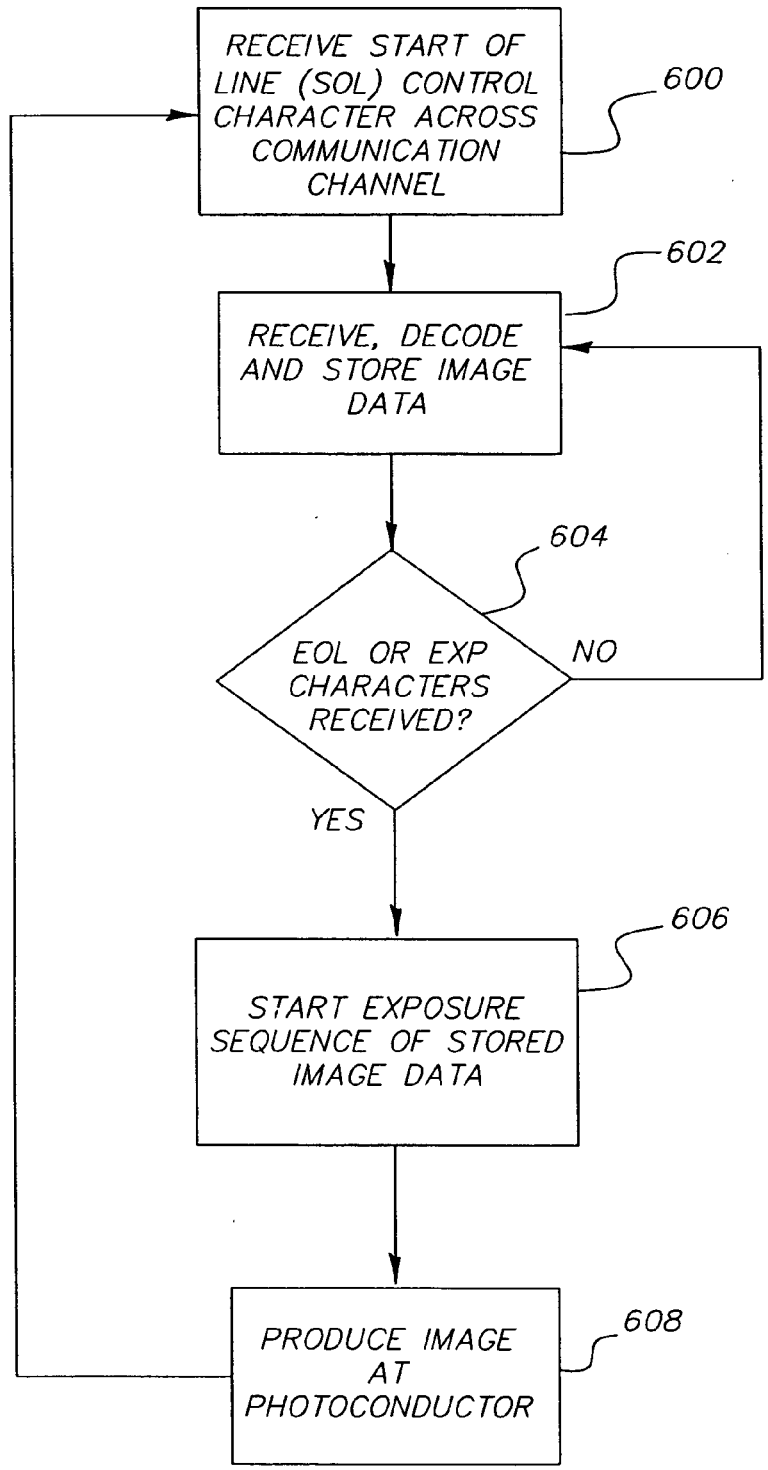
FIG. 6 illustrates processing logic for receiving image data and producing the image data at a photoconductor.

FIG. 6 illustrates processing logic for receiving image data and producing the image data at a photoconductor. In logic block 600, the receiver receives and decodes a start of line character sent by the transmitter over the communication channel. This indicates to the receiver that a line of image data is to follow as indicated in logic block 602. The line of image data is delimited by the end of line character. In decision block 604, a test is made to determine if the end of line character or exposure start control word has been received. If neither the end of line character or exposure start control word has been received, the receiver continues to receive and decode the line of image data (control returns to logic block 602). If the EOL character has been received, then following receipt of the exposure control word a defined number of clock cycles later, the exposure sequence for image data stored at the imaging element commences as indicated in logic block 606. Likewise, if the EOL character is not received, but the EXP control word is, the receiver processing logic recognizes this as the end of a line of image data and proceeds to logic block 606 to start the exposure sequence for the stored image data. The image data is then produced at the photoconductor as indicated in logic block 608. The receiver processing logic then returns to logic block 600 to wait for the next SOL character indicating the next line of image data is being transmitted.

In a second exemplary embodiment, each control character is transmitted twice in succession before any data or the next control character is transmitted. The start of line control character is sent twice before the actual transmission of data characters commences. The end of line control character is sent twice and is followed by duplicate transmission of the exposure control character. The line of data is sent as follows: the transmitter sends the SOL character twice followed by the image data a specified number of clocks later. A specific number of clocks after the last data byte is sent, the transmitter sends the EOL character twice. A specific number of clocks after the EOL character is sent, the transmitter sends the EXP character twice. The transmitter then waits for the next LC transition to send the next line of data.

If the first start of line control character is corrupted, but the second start of line control character is not corrupted, the receiver will recognize that a new line of data is being transmitted. The receiver will continue to receive a line of image data until the end of line control characters are received. As long as either end of line control character is received uncorrupted, the receiver will recognize that the line of image data has been received. Likewise, if either exposure control character is received uncorrupted, the receiver will start exposing the line of image data onto the photoconductor.

In a third exemplary embodiment, at least one alternate control character is transmitted after each control character. This is a generalization of the second embodiment, since each control word is followed by another control word, which can be a special control character or the same as the immediately preceding control character. An alternate character is sent after each of the start of line control character, end of line control character and exposure control character. The line of data is sent as follows: the transmitter sends the SOL character and then the alternate SOL character followed by the image data a specified number of clocks later. A specific number of clocks after the last data byte is sent, the transmitter sends the EOL character followed by the alternate EOL character. A specific number of clocks after the EOL character is sent, the transmitter sends the EXP character followed by the alternate EXP character. The transmitter then waits for the next LC transition to send the next line of data.

If the start of line control character is corrupted, but the alternate start of line control character is not corrupted, the receiver will recognize that a new line of data is being transmitted. The receiver will continue to receive a line of image data until an end of line control character is received. As long as either the end of line control character or the alternate end of line control character is received uncorrupted, the receiver will recognize that the line of image data has been received. Likewise, if either the exposure control character or alternate exposure control character is received uncorrupted, the receiver will start exposing the line of image data onto the photoconductor. As an extension to this embodiment, multiple control characters can follow each of the SOL, EOL and EXP control characters to ensure that the receiver recognizes at least one start of line, at least one end of line and at least one exposure start control word. It may be desirable to send multiple control words to retain channel synchronization in a noisy environment.

Although the invention has been described with reference to LEDs, the concepts of the invention are usable with other recording elements, including electrographic, thermal, laser, inkjet, spatial light modulators, etc.

Those skilled in the art will appreciate that the mechanisms of the present invention are capable of being distributed in the form of computer program instructions in a variety of forms, which when executed on a processing device, perform the methods described herein. The present invention applies regardless of the type of signal bearing medium used to carry out the distribution. Examples of signal bearing media include non-volatile hard-coded media such as read-only memories, recordable-type media, such as floppy disks, hard disk drives, CD-ROMs and DVD-ROMs.

While the invention has been particularly shown and described with reference to preferred embodiments thereof, it will be understood by those skilled in the art that various other changes in form and detail may be made without departing from the spirit and scope of the invention.

What is claimed is:

1. A method of transmitting image data across a communication channel in a printer with improved channel synchronization, comprising transmitting in order across the communication channel a start-of-line control character, an alternate start-of-line control character, a line of image data, an end-of line control character, an alternate end-of-line control character, an exposure-start control character, and an alternate exposure-start control character; wherein the start-of-line control character is followed by the image data a first specified number of clocks later, the alternate start-of-line control character is followed by the image data a second specified number of clocks later, the second specified number being different from the first specified number, and the exposure-start control character is sent a specific number of clocks after the end-of-line control character.

2. A method of receiving image data across a communication channel in a printer with improved channel synchronization, comprising:
    providing the printer having a photoconductor and an exposure system for imagewise modulating charge on the photoconductor;
    receiving across the communication channel a start-of-line control character or an alternate start-of-line control character, followed by a line of image data, followed by an end-of line control character or an alternate end-of-line control character, followed by an exposure-start control character or an alternate exposure-start control character, wherein the start-of-line control character is followed by the image data a first specified number of clocks later, the alternate start-of-line control character is followed by the image data a second specified number of clocks later, the second specified number is different from the first specified number;
    identifying the line of image data using the received start-of-line control character or the received alternate start-of-line control character using the corresponding specified number of clocks; and
    in response to either the exposure-start control character or alternate exposure-start control character being received uncorrupted, exposing the line of image data onto the photoconductor using the exposure system.

* * * * *